US012614903B2

(12) United States Patent
Chauhan

(10) Patent No.: US 12,614,903 B2
(45) Date of Patent: Apr. 28, 2026

(54) EXTERNAL USB-C HARDWARE FAILURE PROTECTION

(71) Applicant: Intel Corporation, Santa Clara, CA (US)

(72) Inventor: Shailendra Singh Chauhan, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 17/842,172

(22) Filed: Jun. 16, 2022

(65) Prior Publication Data

US 2023/0411950 A1 Dec. 21, 2023

(51) Int. Cl.
H02H 3/16 (2006.01)
H02H 1/00 (2006.01)
(52) U.S. Cl.
CPC ............ H02H 3/16 (2013.01); H02H 1/0007 (2013.01)
(58) Field of Classification Search
CPC ........ H02H 3/16; H02H 1/0007; H02H 3/023; H02H 3/202; H02H 1/003; H02H 3/087; G06F 13/385; H01R 13/665
See application file for complete search history.

(56) References Cited

U.S. PATENT DOCUMENTS

| | | | |
|---|---|---|---|
| 9,727,123 B1 * | 8/2017 | Nayak ................. | G06F 13/4282 |
| 10,855,069 B2 * | 12/2020 | Mukhopadhyay ....... | H03K 5/24 |
| 2019/0319447 A1 * | 10/2019 | Mukhopadhyay .. | G06F 13/4295 |
| 2020/0274346 A1 * | 8/2020 | Ding .................... | H02H 1/0007 |
| 2020/0303916 A1 * | 9/2020 | Ontiveros ............. | H02H 3/087 |
| 2022/0385059 A1 * | 12/2022 | Lin ........................ | H02H 3/093 |

* cited by examiner

*Primary Examiner* — Danny Nguyen
*Assistant Examiner* — Nicolas Bellido
(74) *Attorney, Agent, or Firm* — NICHOLSON DE VOS WEBSTER & ELLIOTT LLP

(57) ABSTRACT

USB ports such as Type-C USB-C ports in a personal computer (PC) or other computing device may be configured in dual-role port (DRP) mode. The DRP mode may provide the ability for a port to switch between providing power to an external device and receiving power from an external power source to the into the computing device. The voltage level received from an external power source is typically higher than the voltage level provided to an external device. When a USB device fails, it may apply the higher voltage level to an external device, which may cause the external device to fail. A voltage sense and device detection circuit which may be used to detect an internal failure and prevent a higher internal voltage to be applied to a USB device.

18 Claims, 4 Drawing Sheets

100

120

USB PORT

VBUS

CC1

CC2

125

140

145

CC1 and CC2

20V

135

Q2

130

Q1

110

115

5V

PD CONTROLLER

300

310

DETECT SHORT CIRCUIT AT A TRANSISTOR GROUP

312

DETERMINE NO USB DEVICE IS CONNECTED TO THE USB PORT

314

DETERMINE FIRST VOLTAGE CONDUCTOR IS COUPLED TO VBUS CONDUCTOR WHILE NO USB DEVICE IS CONNECTED TO USB PORT

320

REDUCE SHORT CIRCUIT VOLTAGE

322

COUPLE TRANSISTOR GROUP TO GROUND

324

CAUSE OPEN CIRCUIT AT A FUSE

330

RECEIVE INDICATION OF DETECTION OF SHORT CIRCUIT AT SOC

EXTERNAL USB-C HARDWARE FAILURE PROTECTION

TECHNICAL FIELD

Embodiments described herein generally relate to universal serial bus (USB) devices.

BACKGROUND

USB ports such as Type-C USB-C ports in a personal computer (PC) or other computing device may be configured in dual-role port (DRP) mode. The DRP mode may provide the ability for a port to switch between providing power to an external device and receiving power from an external power source to the into the computing device. The voltage level received from an external power source is typically higher than the voltage level provided to an external device. In an example, a computing device may receive 20V from an external power source, but may provide 5V to an external device such as a USB memory drive. USB-C may be used to receive higher voltage and power levels, such as extended power range (EPR)) standard that may provide 5 A of current at 48V or more.

In switching between lower voltage levels and higher voltage levels, the USB port may result in a hard failure (e.g., permanent hardware failure) that results in a short-circuit, which may connect a system-provided 20V to an output voltage pin. If a user plugs in a USB device rated for 5V to a failed USB port, the application of 20V to the 5V device may result in a permanent failure of the USB device. What is needed is an improved USB port.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth to provide a thorough understanding of some example embodiments. It will be evident, however, to one skilled in the art that the present disclosure may be practiced without these specific details.

Figure 1:
FIG. 1 is a block diagram illustrating a first USB-C system, according to an embodiment.

FIG. 1 is a block diagram illustrating a first USB-C system 100, according to an embodiment. The power delivery (PD) controller 110 may be used to provide power to or receive power from a USB port 120. The PD controller 110 may control PD switch 115 and transistors Q1 130 and Q2 135 such that the computing device either provides 5V to the USB device or receives from a voltage bus (VBUS) pin 125 on the USB port 120.

In operation, the PD controller 110 may receive an indication of the type of USB device that has been connected, such as receiving an indication via configuration channel 1 (CC1) 140 or configuration channel 2 (CC2) 145. If the PD controller 110 determines that the connected device is an external device that should receive 5V, the PD controller closes PD switch 115 and provide 5V through the PD controller 110 to the USB port 120. If the PD controller 110 determines that the connected device is a power supply that should provide 20V, the PD controller controls transistors Q1 130 and Q2 135 to connect an internal line to the VBUS pin 125. While the internal 20V line is typically used for receiving 20V from a power supply, transistors Q1 130 and Q2 135 are also used to prevent an internal 20V line from being conducted to an external USB device.

Figure 2:
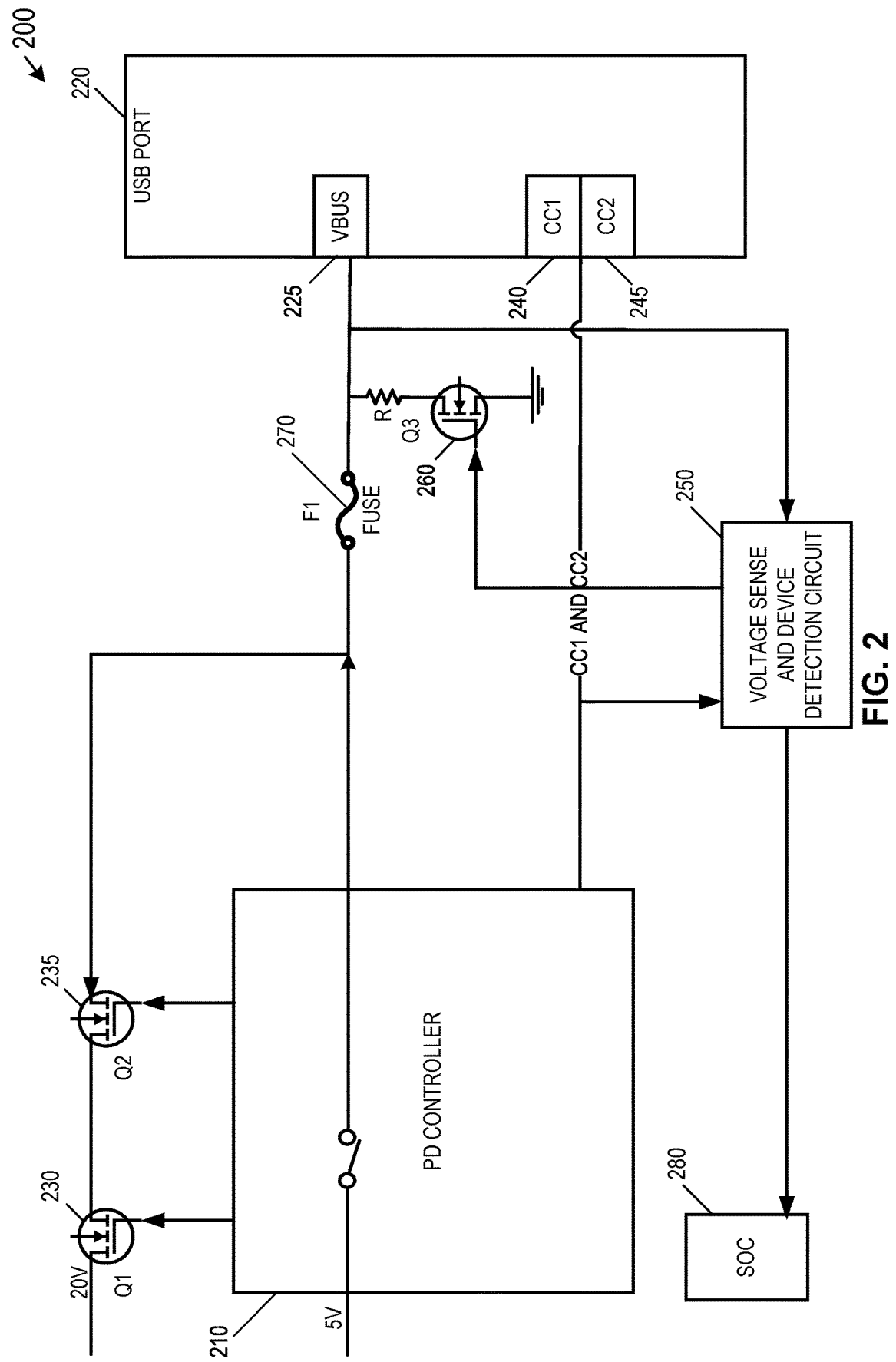
FIG. 2 is a block diagram illustrating a second USB-C system, according to an embodiment.

FIG. 2 is a block diagram illustrating a second USB-C system 200, according to an embodiment. System 200 may include a voltage sense and device detection circuit 250, which may be used to detect a failure at transistors Q1 230 and Q2 235 and prevent 20V from being applied to a USB device. Circuit 250 may be coupled to the conductor connected to VBUS 225, which may be used to determine the voltage being applied to or received from VBUS 225. Circuit 250 may also be coupled to CC1 240 and CC2 245, which may include pull-up or pull-down circuits to indicate whether a device is connected to USB port 220.

When circuit 250 senses that no device is connected to USB port 200 but that 20V is present on the conductor connected to VBUS 225, circuit 250 may determine that transistors Q1 230 and Q2 235 have failed and are conducting 20V from an internal source to VBUS 225. In response to detecting this failure, circuit 250 may cause a pull-down transistor 260 to pull the line connected to VBUS 225 to ground. When VBUS 225 is pulled to ground, the current through fuse 270 is increased such that fuse 270 to opens and prevents 20V from being applied to VBUS 225. Fuse 270 may include a slow-blow fuse to avoid opening fuse 270 during normal operation but enabling fuse 270 to open when 20V is pulled to ground through pull-down transistor 260. This open-fuse state prevents 20V from being applied to an external USB device, and reduces or prevents damage to an external USB device caused by a failure in transistors Q1 230 and Q2 235.

When the voltage sense and device detection circuit 250 detects that transistors Q1 230 and Q2 235 have failed, the voltage sense and device detection circuit 250 may also latch this failure state and send a message to the system, such as by sending a failure state indication to a system-on-a-chip (SOC) 280. The SOC may provide this information to the system, which may be used to notify a user of the failure of USB port 220. The failure may be presented through an operating system indication or a hardware status indicator (e.g., status light-emitting diode (LED)) associated with USB port 220. Upon receiving this indication, a user may replace second USB-C system 200 or one or more of the components shown in second USB-C system 200.

Figure 3:
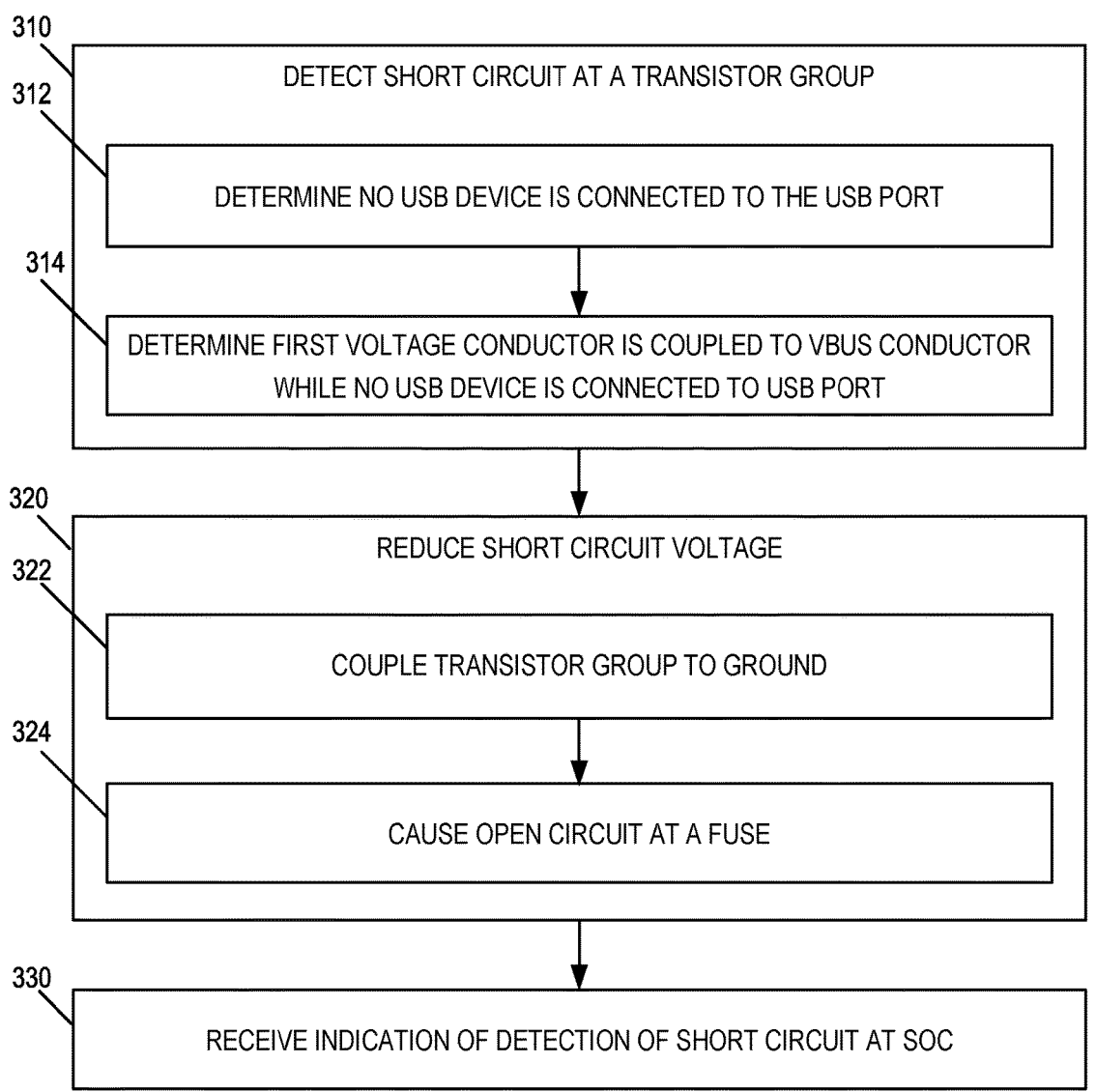
FIG. 3 is a flowchart illustrating a method for external USB-C hardware failure protection, according to an embodiment.

FIG. 3 is a flowchart illustrating a method 300 for external USB-C hardware failure protection, according to an embodiment. Method 300 includes detecting 310 a short circuit at a transistor group conductively coupled between a first voltage conductor and a first voltage conductor to a voltage bus (VBUS) conductor on a universal serial bus (USB) port, the short circuit detected at a voltage sense circuit. Method 300 includes reducing 320 a short circuit voltage between the first voltage conductor and the VBUS conductor in response to detecting the short circuit. Reducing the short circuit voltage 320 may include causing 322 a pull-down transistor to couple the transistor group to a ground. Coupling the transistor group to the ground may include causing 324 an open circuit at a fuse coupled between the transistor group and the pull-down transistor. The fuse may include a slow-blow fuse, where the current rating of the slow-blow fuse may be selected to cause the open circuit in response to a current level induced when the transistor group is coupled to the ground for a predetermined duration.

The detection 310 of the short circuit may include determining 312 no USB device is connected to the USB port. The detection 310 of the short circuit may further include determining 314 that a first voltage on the first voltage conductor is coupled to the VBUS conductor while no USB device is connected to the USB port. Determining 312 that no USB device is connected to the USB port may be based on a configuration indication received from a configuration channel conductor at the voltage sense circuit. Method 300 may further include receiving 330 an indication of the detection of the short circuit at a system-on-a-chip (SOC) from the voltage sense circuit.

Figure 4:
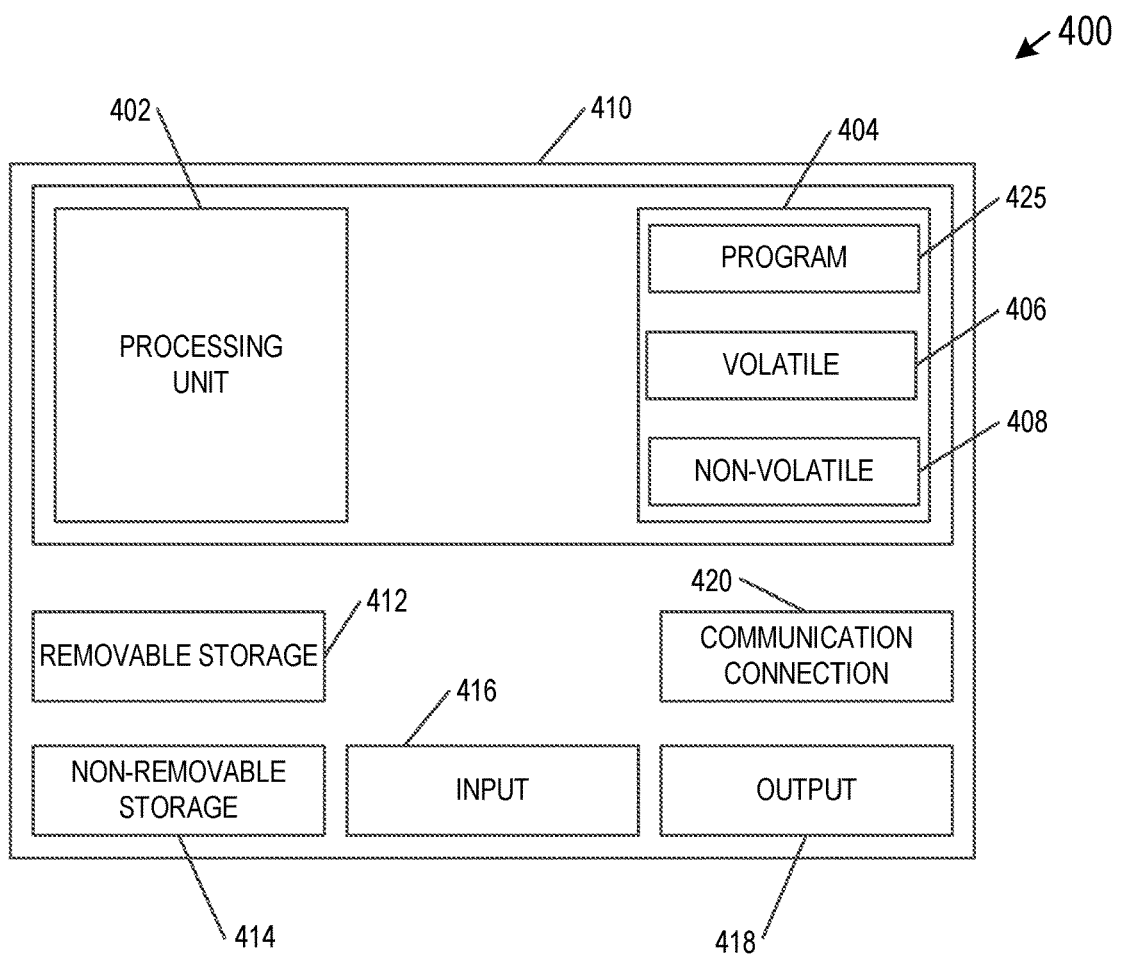
FIG. 4 is a block diagram of a computing device, according to an embodiment.

FIG. 4 is a block diagram of a computing device 400, according to an embodiment. The performance of one or more components within computing device 400 may be improved by including one or more of the circuits or circuitry methods described herein. Computing device 400 may include a first stacked transistor voltage converter circuit, a first stacked transistor driver circuit coupled to the first stacked transistor voltage converter circuit, a second stacked transistor voltage converter circuit coupled to the first stacked transistor voltage converter circuit, and a second stacked transistor driver circuit coupled to the second stacked transistor voltage converter circuit.

In one embodiment, multiple such computer systems are used in a distributed network to implement multiple components in a transaction-based environment. An object-oriented, service-oriented, or other architecture may be used to implement such functions and communicate between the multiple systems and components. In some embodiments, the computing device of FIG. 4 is an example of a client device that may invoke methods described herein over a network. In some embodiments, the computing device of FIG. 4 is an example of one or more of the personal computer, smartphone, tablet, or various servers.

One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, or other computing device including the same or similar elements as illustrated and described with regard to FIG. 4. Further, although the various data storage elements are illustrated as part of the computer 410, the storage may include cloud-based storage accessible via a network, such as the Internet.

Returning to the computer 410, memory 404 may include volatile memory 406 and non-volatile memory 408. Computer 410 may include or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include one or more of a touchscreen, touchpad, mouse, keyboard, camera, and other input devices. The input 416 may include a navigation sensor input, such as a GNSS receiver, a SOP receiver, an inertial sensor (e.g., accelerometers, gyroscopes), a local ranging sensor (e.g., LIDAR), an optical sensor (e.g., cameras), or other sensors. The computer may operate in a networked environment using a communication connection 420 to connect to one or more remote computers, such as database servers, web servers, and another computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

The apparatuses and methods described above may include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

In the detailed description and the claims, the term "on" used with respect to two or more elements (e.g., materials), one "on" the other, means at least some contact between the elements (e.g., between the materials). The term "over" means the elements (e.g., materials) are in close proximity, but possibly with one or more additional intervening elements (e.g., materials) such that contact is possible but not required. Neither "on" nor "over" implies any directionality as used herein unless stated as such.

In the detailed description and the claims, a list of items joined by the term "at least one of" may mean any combination of the listed items. For example, if items A and B are listed, then the phrase "at least one of A and B" means A only; B only; or A and B. In another example, if items A, B, and C are listed, then the phrase "at least one of A, B and C"

means A only; B only; C only; A and B (excluding C); A and C (excluding B); B and C (excluding A); or all of A, B, and C. Item A may include a single element or multiple elements. Item B may include a single element or multiple elements. Item C may include a single element or multiple elements.

In the detailed description and the claims, a list of items joined by the term "one of" may mean only one of the list items. For example, if items A and B are listed, then the phrase "one of A and B" means A only (excluding B), or B only (excluding A). In another example, if items A, B, and C are listed, then the phrase "one of A, B and C" means A only; B only; or C only. Item A may include a single element or multiple elements. Item B may include a single element or multiple elements. Item C may include a single element or multiple elements.

ADDITIONAL NOTES AND EXAMPLES

The subject matter of any Examples above may be combined in any combination.

The above description and the drawings illustrate some embodiments of the inventive subject matter to enable those skilled in the art to practice the embodiments of the inventive subject matter. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
a power delivery controller (PD) circuit configured to switchably couple a first voltage conductor to a voltage bus (VBUS) conductor on a universal serial bus (USB) port;
a transistor group configured to switchably couple a second voltage conductor to the VBUS conductor;
a voltage sense circuit to:
detect a short circuit between the first voltage conductor and the VBUS conductor; and
reduce a short circuit voltage between the first voltage conductor and the VBUS conductor in response to detecting the short circuit; and
a pull-down transistor configured to switchably couple the transistor group to a ground, wherein reducing the short circuit voltage includes causing the pull-down transistor to couple the transistor group to the ground.

2. The system of claim 1, further including a fuse coupled between the transistor group and the pull-down transistor; wherein coupling the transistor group to the ground causes an open circuit at the fuse.

3. The system of claim 2, wherein:
the fuse includes a slow-blow fuse; and
a current rating of the slow-blow fuse is selected to cause the open circuit in response to a current level induced when the transistor group is coupled to the ground for a predetermined duration.

4. The system of claim 1, wherein the detection of the short circuit includes:
determining no USB device is connected to the USB port; and
determining that a first voltage on the first voltage conductor is coupled to the VBUS conductor while no USB device is connected to the USB port.

5. The system of claim 4, further including a configuration channel conductor on the USB port;
wherein determining that no USB device is connected to the USB port is based on a configuration indication received from the configuration channel conductor at the voltage sense circuit.

6. The system of claim 1, further including a system-on-a-chip (SOC) to receive an indication of the detection of the short circuit from the voltage sense circuit.

7. A method comprising:
detecting a short circuit at a transistor group conductively coupled between a first voltage conductor and a first voltage conductor to a voltage bus (VBUS) conductor on a universal serial bus (USB) port, the short circuit detected at a voltage sense circuit; and
reducing a short circuit voltage between the first voltage conductor and the VBUS conductor in response to detecting the short circuit,
wherein reducing the short circuit voltage includes causing a pull-down transistor to couple the transistor group to a ground.

8. The method of claim 7, wherein coupling the transistor group to the ground includes causing an open circuit at a fuse coupled between the transistor group and the pull-down transistor.

9. The method of claim 8, wherein:
the fuse includes a slow-blow fuse; and
a current rating of the slow-blow fuse is selected to cause the open circuit in response to a current level induced when the transistor group is coupled to the ground for a predetermined duration.

10. The method of claim 7, further including receiving an indication of the detection of the short circuit at a system-on-a-chip (SOC) from the voltage sense circuit.

11. The method of claim 7, wherein the detection of the short circuit includes:
determining no USB device is connected to the USB port; and
determining that a first voltage on the first voltage conductor is coupled to the VBUS conductor while no USB device is connected to the USB port.

12. The method of claim 11, wherein determining that no USB device is connected to the USB port is based on a configuration indication received from a configuration channel conductor at the voltage sense circuit.

13. At least one non-transitory machine-readable storage medium, comprising a plurality of instructions that, responsive to being executed with processor circuitry of a computer-controlled device, cause the processor circuitry to:
detect a short circuit at a transistor group conductively coupled between a first voltage conductor and a first voltage conductor to a voltage bus (VBUS) conductor on a universal serial bus (USB) port, the short circuit detected at a voltage sense circuit; and
reduce a short circuit voltage between the first voltage conductor and the VBUS conductor in response to detecting the short circuit, wherein reducing the short circuit voltage includes causing a pull-down transistor to couple the transistor group to a ground.

14. The at least one non-transitory machine-readable storage medium of claim 13, wherein coupling the transistor group to the ground includes causing an open circuit at a fuse coupled between the transistor group and the pull-down transistor.

15. The at least one non-transitory machine-readable storage medium of claim 14, wherein:

the fuse includes a slow-blow fuse; and a current rating of the slow-blow fuse is selected to cause the open circuit in response to a current level induced when the transistor group is coupled to the ground for a predetermined duration.

16. The at least one non-transitory machine-readable storage medium of claim 13, the instructions further causing the processor circuitry to receive an indication of the detection of the short circuit at a system-on-a-chip (SOC) from the voltage sense circuit.

17. The at least one non-transitory machine-readable storage medium of claim 13, wherein the detection of the short circuit includes:

determining no USB device is connected to the USB port; and determining that a first voltage on the first voltage conductor is coupled to the VBUS conductor while no USB device is connected to the USB port.

18. The at least one non-transitory machine-readable storage medium of claim 17, wherein determining that no USB device is connected to the USB port is based on a configuration indication received from a configuration channel conductor at the voltage sense circuit.

* * * * *